United States Patent [19]

Nakayama

[11] Patent Number: 4,723,336

[45] Date of Patent: Feb. 9, 1988

[54] WIPER BLADE

[75] Inventor: Yasuzi Nakayama, Kobe, Japan

[73] Assignee: Hyogo Kaisan Kabushiki Kaisha, Kobe, Japan

[21] Appl. No.: 873,599

[22] Filed: Jun. 12, 1986

[30] Foreign Application Priority Data

Jun. 20, 1986 [JP] Japan .................................. 60-135446

[51] Int. Cl.$^4$ .................................................. B60S 1/38
[52] U.S. Cl. .................................. 15/250.41; 15/250.04
[58] Field of Search ........... 15/250.36, 250.40, 250.41, 15/250.42, 250.04, 250.01

[56] References Cited

U.S. PATENT DOCUMENTS

| 2,080,129 | 5/1937 | Gulotta | 15/250.41 |
| 4,317,251 | 3/1982 | Priesemuth | 15/250.41 |
| 4,339,839 | 7/1982 | Knights | 15/250.41 X |

FOREIGN PATENT DOCUMENTS

| 711911 | 10/1941 | Fed. Rep. of Germany | 15/250.41 |
| 3134083 | 3/1983 | Fed. Rep. of Germany | 15/250.04 |
| 427534 | 6/1967 | Switzerland | 15/250.04 |

Primary Examiner—Peter Feldman
Attorney, Agent, or Firm—Marshall, O'Toole, Gerstein, Murray & Bicknell

[57] ABSTRACT

A wiper blade for a windshield glass of a vehicle, including a pair of opposing blades which extend approximately parallel from the side edges of the face of a blade body, said body being provided with a component at its base for engagement to a supporting wiper arm. A center rib extends from the center of the face of the blade body between the two opposing blades, and on at least the inside of each of the opposing blades, a wiping piece projects in the longitudinal direction in such a manner that it is in contact with the surface of the glass when the wiper blade is operated.

8 Claims, 7 Drawing Figures

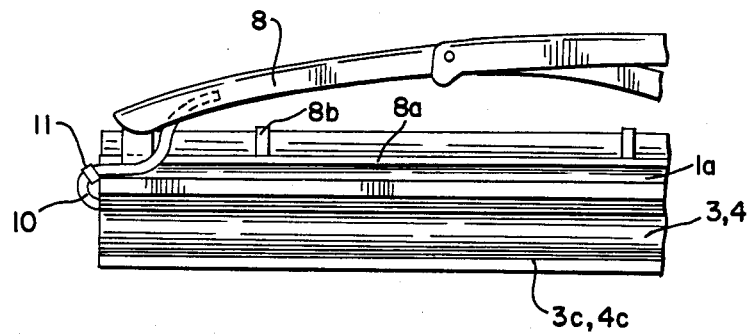
FIG_1_
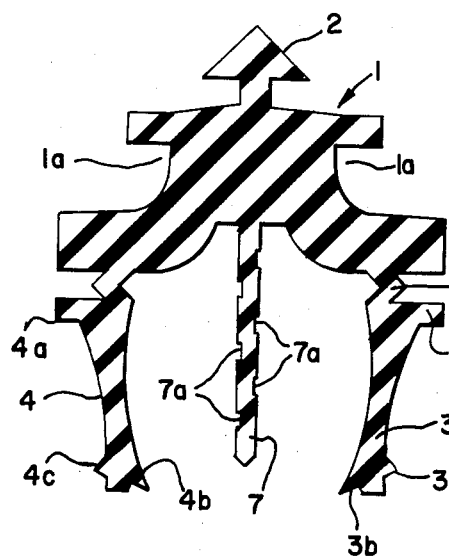
FIG_2_
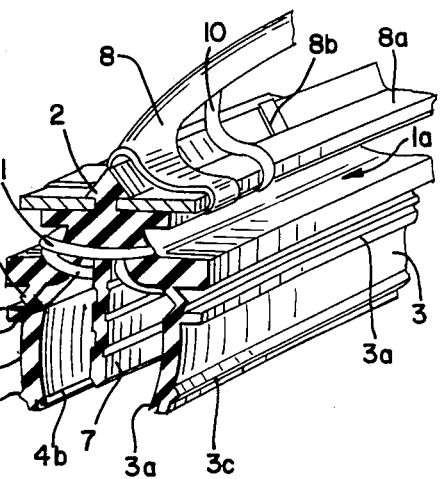
FIG_3_

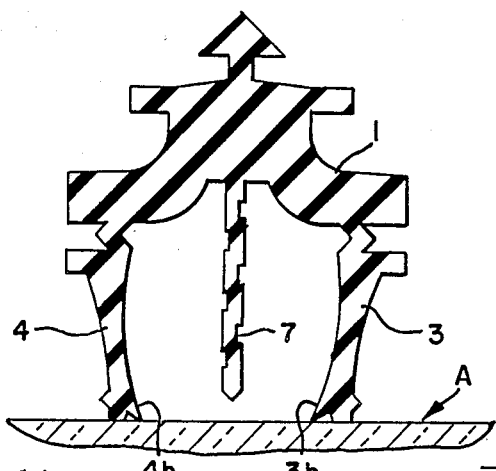
FIG_4a_
FIG_4b_
FIG_4c_
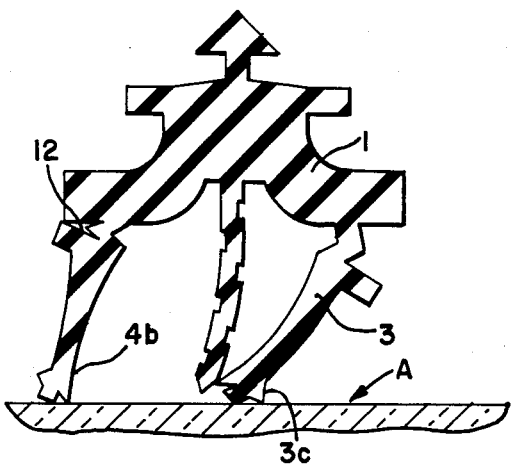
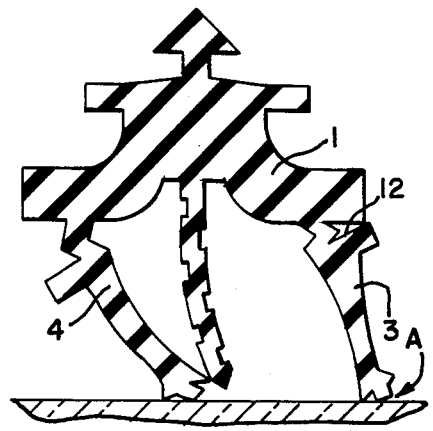
FIG_5_
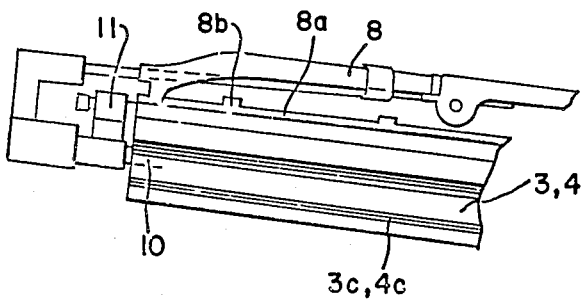

WIPER BLADE

FIELD AND BACKGROUND OF THE INVENTION

This invention relates to a windshield wiper blade used mainly on the outer surfaces of the front and/or rear windows of the driver/operator compartments of such vehicles as automobiles and railroad locomotives.

In the past, in addition to blades having a one-blade construction, blades of two- and three-blade constructions have been proposed for use to wipe rainwater, etc., from the surfaces of the windows of vehicles. However, wiper blades of a one-blade construction have not provided sufficient wiping of the rainwater, etc., thus allowing some water to remain on the glass, and also this type of wiper blade has lacked durability, thus failing to provide a long useful life.

For wiper blades with a two-blade construction, although the useful life has been longer than that of the one-bladed wiper blades, because the edges of both blades came together in close contact during the back-and-forth movement of the wiper, this type of wiper blade, just as with the one-bladed wiper blade, did not provide sufficient wiping of the rainwater, etc., (especially when an oily film is present), thus allowing some water to remain on the glass and failing to ensure the necessary safety.

In addition, for wiper blades having a three-blade construction, because the edges of the two outer blades came in close contact with the edge of the center blade during the back-and-forth movement of the wiper, the wiping performance has been substantially no more effective than that of the two-bladed wiper blade, thus making the costs considerably high in relation to the wiping performance.

Furthermore, because conventional wiper blades generally use their edge to wipe away the rainwater, etc. during the back-and-forth swinging motion of the blade, the edge of the blade must be formed with a corner angle of exactly 90°. Because of this, during the production of the wiper blades, for example, when a pair of long wiper blades are injection molded with their edges abutting, the abutting edges had to be cut in the longitudinal direction accurately so that the corner angles would be exactly 90°, and this cutting process required a considerable amount of precision, thus making the production work rather difficult.

It is a general object of the present invention to provide a wiper blade which does not require that the edge of the blade be specially cut accurately at a right angle, thus simplifying the production process, and also which, in comparison to conventional wiper blades, provides both superior wiping performance, allowing less rainwater, etc., to remain on the glass surface, and having a longer useful life.

BRIEF SUMMARY OF THE INVENTION

A wiper blade according to this invention comprises a pair of opposing blades which extend approximately parallel from opposite side edges of the face of the blade body, and a center rib which extends from the center of the face of the blade body. On the inside of at least each of the opposing blades, a wiping piece projects in the longitudinal direction in such a manner that it is in contact with the surface of the glass when the wiper blade is operated.

BRIEF DESCRIPTION OF THE DRAWINGS

This invention may be better understood from the following detailed description taken in conjunction with the accompanying figures of the drawings, wherein:

FIG. 1 shows a partial perspective view of a wiper blade according to this invention, mounted on a wiper arm;

FIG. 2 shows an enlarged cross-sectional view of the wiper blade;

FIG. 3 shows an enlarged perspective view of one end of the wiper blade;

FIGS. 4a through 4c show cross-sectional views illustrating the operational states of the wiper blade; and FIG. 5 shows a partial perspective view of the wiper blade mounted on a wiper arm, using a different mounting apparatus from that shown in FIG. 1.

DETAILED DESCRIPTION

With reference to FIGS. 1 and 2, the numeral 1 represents a blade body, the cross-sectional shape of which is roughly the shape of a five-pointed star, and, at the top of this blade body 1, an engagement head 2 having a triangular cross-sectional shape is formed as a unified part of the blade body 1. The head 2 is utilized to attach the blade to a wiper arm 8, and the shape of this engagement head 2 may be changed as appropriate to match the type of wiper arm 8, as will be described later.

The numerals 3 and 4 are a pair of opposing wiper blades, and each of these two blades 3 and 4 is connected at its base (the upper end as seen in FIG. 2) to the blade body 1 in the vicinity of one of the opposite side edge of the lower surface of the blade body 1. A connecting piece 5 is provided to connect the blades 3 and 4 to the body 1, each piece 5 having an angular cross-sectional shape such as to both facilitate the inward flexure and to hinder the outward flexure of the associated blade. In addition, at the top of the outward surface of each of these two opposing blades 3 and 4, a projection 3a and 4a projects laterally outwardly from the longitudinal direction of the blade. When either of the blades 3 and 4 flexes laterally outwardly, the corresponding projection 3a and 4a comes in contact with the outer edge of the lower surface of the blade body 1 as indicated by the contact points 12 in FIGS. 4b and 4c, thus hindering the further outward flexure of the blade 3 and 4. Furthermore, adjacent the lower edge of each of the two opposing blades 3 and 4 is provided a wiping piece 3b and 4b (FIG. 2) which has a triangular cross-sectional shape and extends in the longitudinal direction, in such a manner that it is in contact with the surface of the glass A during the swinging or wiping motion of the blade body 1. The wiping piece of each blade preferably extends laterally inwardly in the direction of a center rib 7 but it could instead extend laterally outwardly away from the rib 7. The drawings show laterally inward wiping pieces 3b and 4b and they are more efficient in wiping water as compared with laterally outward wiping pieces. Note that it is possible for these wiping pieces 3b and 4b to have a cross-sectional shape other than the triangular one shown in the drawing.

The numerals 3c and 4c indicate laterally outward projections having a triangular cross-sectional shape, and these projections 3c and 4c are provided either continuously or intermittently in the longitudinal direction along the outward sides (near the bottom edges) of each of the two opposing blades 3 and 4. These projections 3c and 4c precede the outward surfaces of the blades 3 and 4, which bend inward during the swinging movement of the wiper, in their contact with the glass surface A, thus making it possible for the blades 3 and 4 to slide smoothly across the surface of the glass.

A thin center rib 7 extends down from the center of the blade body 1 between the blades 3 and 4, and it is designed in such a manner that its bottom edge does not extend down quite as far as the bottom edges of the two opposing blades 3 and 4. In addition, long parallel grooves 7a are formed in the longitudinal direction on both sides of the center rib 7 in diagonally alternating positions, as shown in FIG. 2. In other words, the grooves 7a on one side of the rib 7 are vertically offset from the grooves 7a on the other side.

The numeral 8 represents the wiper arm, and it includes a pair of retainers 8a (see FIG. 3), between which the engagement head 2 of the blade body 1 is inserted in such a manner that the lower part of the engagement head 2 is held between the retainers 8a. A number of engagement pawls 8b are provided at specified intervals along the longitudinal direction of the wiper arm 8, both ends of which are secured to the retainers 8a. The blade body 1 is thus mounted to the wiper arm 8 by sliding one end of the blade 1 in from one end of the wiper arm 8.

FIG. 3 shows a perspective view of one end (the upper part during operation) of the wiper. In this drawing, 10 is a pair of washer fluid spray tubes, and each of these washer fluid spray tubes 10 is routed along one of the lateral channels 1a on either side of the blade body 1. These washer fluid spray tubes 10 are bent in a U shape in such a manner that the fluid spray holes are directed into the spaces between the two opposing blades 3 and 4 and the center rib 7. In addition, the ends of this pair of washer fluid spray tubes 10 are secured by a securing fixture 11. Also, the other ends of the washer fluid spray tubes 10 are connected to the customary washer tube (not shown) from the washer fluid tank via a branching tube at one end of the blade body 1.

FIGS. 4a through 4c illustrate the operation of the blade. In the normal state (when not in operation), as shown in FIG. 4a, although the bottom edges of the two opposing blades 3 and 4 are forcefully pressed against the glass surface A by the arm 8, the wiping pieces 3b and 4b are either very slightly separated from the glass surface A or, if they are in contact, the force pressing them against the glass surface A is extremely weak. Thus the wiping pieces 3b and 4b are less affected by the heating up (summer season) and the freezing (winter season) of the glass surface A, and are consequently less subjected to deterioration. During operation of the wiper, as shown in FIGS. 4b and 4c, the blade 3 and the blade 4 on the side toward which the wiper is moving, bends considerably in the opposite direction, causing the wiping piece 3b and 4b on the inside of the edge of that blade 3 and 4 to come in contact with the center rib 7, and also causing the outside of the bottom edge of that blade 3 and 4 and the projection 3c and 4c to be in contact with the glass surface A while the wiper moves, thus wiping the rainwater, etc., from the glass surface A. Meanwhile, the blade 4 (or 3) on the opposite side bends slightly less, so that the wiping piece 4b (or 3b) at its edge is in contact with the glass surface A, thus wiping away any rainwater, etc., which the first blade 3 (or 4) failed to wipe away.

Note that because any dust, etc., adhering to the glass surface A is wiped away by the blade on the side in which the wiper moves, there is little chance of such dust, etc., becoming trapped in the space between the two opposing blades 3 and 4, and, in the event that any dust etc., does become trapped within this space, the spraying of the washer fluid will wash the dust, etc., away. Furthermore, because the washer fluid is sprayed within the spaces between the two opposing blades 3 and 4 and the center rib 7, vision is not obscured by the spraying of the fluid across the entire surface of the glass simultaneously, thus ensuring greater safety when the washer is operated during driving the vehicle, and also providing greater economy by making more effective use of the washer fluid.

FIG. 5 shows a wiper blade similar to that described above, supported by a different design of a supporting wiper arm.

It will be apparent that a wiper blade according to this invention has a number of advantages. Because the center rib is provided between the two opposing blades, the two blades are kept separate during operation of the wiper, so that after one of the blades wipes away the rainwater, etc., the other blade will also wipe away any rainwater, etc., which still remains, thus preventing any rainwater, etc., from remaining on the glass surface.

Because a wiping piece 3b and 4b projects from the inside of the edge of each of the two opposing blades, it is not necessary to cut with extreme accuracy to make certain that the corner angles of the blade edges are exactly 90° when, for example, a pair of blades are formed together with their edges abutting.

This simplifies the manufacturing process and facilitates mass production. In addition, because these wiping pieces either are not in contact with, or are not being pressed forcefully against, the glass surface in the normal state (when the wiper is not in operation), and also because they are protected by the blades from exposure to direct sunlight and atmospheric influences, damage and general deterioration of these wiping pieces is retarded, thus providing greater durability.

Because the wiper blade is constructed in such a manner that spaces are formed between the two opposing blades and the center rib, the mounting of spray tubes to spray washer fluid into these spaces not only allows the washer fluid to wash away any dust, etc., from between the blades, but, because the washer fluid will thus be sprayed only on the parts of the glass surface which are being wiped, smaller amounts of washer fluid can be put to more effective use and the washer fluid will not soil other parts of the vehicle.

By forming the blade body so that its cross-sectional shape is roughly the shape of a five-pointed star, and thus forming lateral channels of each side of the blade body, when the wiper blade is mounted to the wiper arm, differences in the type of wiper arm or in the mounting method will not affect the wiper blade. Moreover, because the wiper blade is held securely by the wiper arm, the appropriate position can be maintained, and also, because the retainers of the wiper arm are in secure contact with the top of the blade body and support the blade body, the wiper blade will always be kept at a right angle to the glass surface, regardless of the wiping position, thus ensuring consistent wiping performance.

What is claimed is:

1. A wiper blade for clearing a surface, comprising an elongated wiper body having a base side and a face side and said face side having side edges, a pair of opposing blades which extend substantially parallel with each other and along the length of said body, one of said opposing blades being connected to each of said side edges and extending away from said face side, said body further including means on said base side for attachment of said wiper blade to a supporting wiper arm, said wiper blade further comprising a center rib which is connected to said body between said opposing blades and said side edges, said center rib being shorter than said opposing blades and out of contact with the surface during operation, said opposing blades flexing when the wiper blade is moved across the surface and one of said blades flexing into engagement with said center rib at a level which is displaced from said surface, and each of said opposing blades having a wiping piece formed thereon and extending along the length thereof, said wiping piece of each blade being located to contact said surface when the wiper blade is moved across the surface.

2. A wiper blade as described in claim 1, and further comprising connecting pieces for connecting said two opposing blades at their bases to said blade body, each of said connecting pieces having an angular cross-sectional shape to both facilitate the inward flexure and hinder the outward flexure of said opposing blades.

3. A wiper blade as described in claim 2, wherein the cross-sectional shape of said blade body is substantially the shape of a five-pointed star, and lateral channels are formed on each side of said blade body.

4. A wiper blade as described in any of claims 1 through 3, wherein said center rib is thinner than said two opposing blades.

5. A wiper blade as describd in claim 1, and further including means for injecting a cleaning fluid in spaces formed between said center rib and each of said opposing blades.

6. A wiper blade as described in claim 1, wherein said wiping piece of each of said blades extends in the direction of said center rib.

7. A wiper blade as described in claim 6, wherein said wiping piece is engageable with said center rib during operation when said blades flex.

8. A wiper blade as described in claim 1, wherein said wiping piece of each of said blades extends in the direction which is away from said center rib.

* * * * *